US012627383B2

(12) United States Patent
Chen et al.

(10) Patent No.: US 12,627,383 B2
(45) Date of Patent: May 12, 2026

(54) CALIBRATION CIRCUIT, CALIBRATION METHOD FOR FILTER AND FILTER DEVICE

(71) Applicants: Beijing ESWIN Computing Technology Co., Ltd., Beijing (CN); Guangzhou Transa Semi Information Technology Co., Ltd., Guangzhou (CN)

(72) Inventors: Zhiyong Chen, Beijing (CN); Yangyang Li, Beijing (CN)

(73) Assignees: Beijing ESWIN Computing Technology Co., Ltd., Beijing (CN); Guangzhou Transa Semi Information Technology Co., Ltd., Guangzhou (CN)

( * ) Notice: Subject to any disclaimer, the term of this patent is extended or adjusted under 35 U.S.C. 154(b) by 686 days.

(21) Appl. No.: 18/163,397

(22) Filed: Feb. 2, 2023

(65) Prior Publication Data

US 2023/0379066 A1 Nov. 23, 2023

(30) Foreign Application Priority Data

May 23, 2022 (CN) .......................... 202210564495.5

(51) Int. Cl.
*H04B 17/11* (2015.01)
*H04B 17/21* (2015.01)

(52) U.S. Cl.
CPC ............. *H04B 17/11* (2015.01); *H04B 17/21* (2015.01)

(58) Field of Classification Search
CPC ...... H04B 17/11; H04B 17/21; H03H 11/126; H03H 2210/04
See application file for complete search history.

(56) References Cited

U.S. PATENT DOCUMENTS 11,133,806 B1 * 9/2021 Jacquet ................. H03L 7/1976
2006/0220752 A1 10/2006 Fukusen
(Continued)

FOREIGN PATENT DOCUMENTS

CN 103716040 A 4/2014
CN 105958964 A 9/2016
CN 114374385 A 4/2022

OTHER PUBLICATIONS

Translation of Chinese Office Action for Chinese Patent Application No. 2022105644955 dated Jul. 24, 2025, 16 pages.

*Primary Examiner* — Redentor Pasia
(74) *Attorney, Agent, or Firm* — Westman, Champlin & Koehler, P.A.

(57) ABSTRACT

Disclosed is a calibration circuit, a calibration method for a filter and a filter device. The calibration circuit includes: a signal receiving terminal, receiving an output signal from the filter; a frequency detection module, obtaining a count value according to the output signal, the count value representing a frequency of the output signal; an adjustment module, adjusting the control signal according to the count value and a target value representing a target frequency, to adjust the frequency of the output signal provided by the filter until a calibration value, which allows the count value to be consistent with the target value, of the control signal is determined. The filter performs filtering according to the control signal with the calibration value in an operating stage. The calibration circuit performs feedback adjustment on the filter to achieve bandwidth calibration with high calibration accuracy and simple circuit structure.

14 Claims, 4 Drawing Sheets input signal $Vi$ → filter 100 → output signal $Vo$ control signal $Vc$ target value $N\_target$ → adjustment module 230 ← frequency detection module 220 ← signal receiving terminal 210 count value $N\_cal$

200

(56) References Cited

U.S. PATENT DOCUMENTS

| | | | |
|---|---|---|---|
| 2011/0260763 A1* | 10/2011 | Wang | H03L 7/099 |
| | | | 327/157 |
| 2013/0181781 A1* | 7/2013 | Tan | H03K 3/0322 |
| | | | 331/57 |
| 2021/0083678 A1* | 3/2021 | Mosalikanti | H03K 3/0315 |
| 2021/0258013 A1* | 8/2021 | Wu | H03L 7/0992 |
| 2021/0325424 A1* | 10/2021 | Sato | G01P 15/097 |
| 2022/0021373 A1* | 1/2022 | Sautto | H10N 30/30 |
| 2022/0166458 A1* | 5/2022 | Chopra | H04B 1/0082 |
| 2023/0163795 A1* | 5/2023 | Luan | H03M 1/66 |
| | | | 375/296 |
| 2023/0216486 A1* | 7/2023 | Zhou | H03H 11/04 |
| 2023/0253185 A1* | 8/2023 | Lyndaker | H01J 37/32183 |
| | | | 315/111.21 |
| 2024/0069591 A1* | 2/2024 | Nie | H03K 3/013 |
| 2025/0239857 A1* | 7/2025 | Suzuki | H02J 3/32 |

* cited by examiner

1

CALIBRATION CIRCUIT, CALIBRATION METHOD FOR FILTER AND FILTER DEVICE

CROSS-REFERENCE TO RELATED APPLICATIONS

The present application claims priority to Chinese Patent Application No. 202210564495.5, filed on May 23, 2022, entitled by "CALIBRATION CIRCUIT, CALIBRATION METHOD FOR FILTER AND FILTER DEVICE", and published as CN115021716A on Sep. 6, 2022, which is incorporated herein by reference in its entirety.

TECHNICAL FIELD

The present disclosure relates to a technical field of integrated circuits, and in particular to a calibration circuit, a calibration method for a filter and a filter device.

BACKGROUND

With the development of science and technology, communication systems are increasingly applied in the fields of education, transportation, scientific research, daily life, etc. In a receiver of the communication system, a filter is an indispensable module. The bandwidth is one of important parameters of the filter. If the bandwidth is too high, the noise performance of the system may be deteriorated and even the linearity of the system may be affected; and if the bandwidth is too low, a useful signal may be filtered out, so that error rate may be increased and the performance of the receiver may be reduced. Therefore, it is very important to precisely control the bandwidth of the filter. When the filter has an appropriate bandwidth, it can effectively filter out-of-band noise and interference, and can improve sensitivity of the receiver. However, the filter in the art is difficult to provide an accurate bandwidth.

SUMMARY

The present disclosure provides a calibration circuit, a calibration method for a filter and a filter device, so as to improve accuracy of a filtering bandwidth.

According to a first aspect of the present disclosure, a calibration circuit for a filter is provided, the filter is configured to perform filtering under configuration of a control signal to provide an output signal, the calibration circuit comprises: a signal receiving terminal, connected with the filter and used for receiving the output signal from the filter; a frequency detection module, connected with the signal receiving terminal and configured to obtain a count value according to the output signal, the count value representing a frequency of the output signal; and an adjustment module, connected with the frequency detection module and configured to adjust the control signal according to the count value and a target value representing a target frequency, so as to adjust the frequency of the output signal provided by the filter until a calibration value, which allows the count value to be consistent with the target value, of the control signal is determined; wherein the filter is configured to perform filtering according to the control signal with the calibration value in an operating stage. The calibration circuit can adjust the frequency of the output signal of the filter to the target frequency, thus feedback adjustment of the filter itself can be achieved, bandwidth calibration accuracy can be high and circuit structure can be simple, embodiments of the present disclosure have advantages of high integration degree, accurate bandwidth and low power consumption.

Optionally, the adjustment module is further configured to provide an initial value of the control signal, so that the filter firstly provides the output signal with an initial frequency according to the control signal with the initial value in an initiating stage prior to the operating stage. In this technical solution, configuration of the initial value can realize an effective control on the filter in different stages based on the control signal, so that the circuit structure can be further simplified.

Optionally, the adjustment module is configured to store a plurality of the control signals with different initial values, and after the target value is obtained, the adjustment module is configured to select one of the control signals that minimizes a difference value between the initial frequency of the output signal and the target frequency and provide the selected control signal to the filter. In this technical solution, selecting an appropriate initial value of the control signal according to the target frequency can save the time required for bandwidth calibration and reduce the power consumption of the circuit.

Optionally, the frequency detection module comprises: a level shifter, connected to the signal input terminal and configured to amplify the output signal; a comparator, connected to the level shifter and configured to compare an amplitude of the amplified output signal with a reference value to generate a square wave signal; and a counter, connected to the comparator and configured to count a rising edge of the square wave signal to obtain the count value. In this technical solution, the arrangement of the level shifter is beneficial to frequency detection performed on the output signal with low voltage amplitude. It should be understood that in some practical applications, the level shifter can be omitted; the frequency detection module converts the output signal into the square wave signal by use of the comparator, so that the counter can count the rising edge, and the frequency of the output signal can be detected simply and quickly.

Optionally, the adjustment module comprises: a difference value calculator, configured to calculate a difference value between the count value and the target value; a dichotomy calculation unit, configured to adjust the control signal according to the difference value, the control signal being used for controlling conduction states of various filter components in the filter; and a storage unit, configured to store the initial value of the control signal, the control signal that allows the difference value to be relatively small, and the calibration value of the control signal. The adjustment module is configured to search for the calibration value of the control signal based on dichotomy principle, can realize quick search, and is beneficial to saving the time required by bandwidth calibration and reducing the power consumption of the circuit.

Optionally, when the count value is consistent with the target value, the difference value calculator is configured to provide a difference value signal of a first error sign bit; when the count value is inconsistent with the target value and the count value is greater than the target value, the difference value calculator is configured to provide a difference value signal of a second error sign bit of a first voltage level; and when the count value is inconsistent with the target value and the count value is less than the target value, the difference value calculator is configured to provide a difference value signal of the second error sign bit of a second voltage level. In this technical solution, the difference value signal may have one of two error sign bits and one of two voltage level states, which facilitates binary search.

Optionally, the adjustment module further comprises a register for storing the target value.

According to a second aspect of the present disclosure, a filter device is provided and comprises a filter and the calibration circuit as described above connected with filter, wherein the filter is used for filtering the input signal to obtain an output signal; and the calibration circuit is used for providing the control signal to adjust the frequency of the output signal to the target frequency.

Optionally, the filter is configured to first provide the output signal with an initial frequency according to the control signal with an initial value in an initiating stage, and perform filtering according to the control signal with the calibration value in the operating stage after the initiating stage.

Optionally, the filter comprises a plurality of filter components, and the control signal is used for controlling conduction states of the plurality of filter components, thereby adjusting the frequency of the output signal, wherein the plurality of filter components comprise a capacitor array and/or a resistor array.

For the second aspect and the beneficial effects of the various optional implementations, reference may be made to the description of the first aspect, which is omitted here.

According to a third aspect of the present disclosure, a calibration method for a filter is provided, wherein the filter is configured to perform filtering under configuration of a control signal to provide an output signal, the calibration method comprises: receiving the output signal from the filter; obtaining a count value according to the output signal, the count value representing a frequency of the output signal; and adjusting the control signal according to the count value and a target value representing a target frequency, so as to adjust a frequency of the output signal provided by the filter until a calibration value, which allows the count value to be consistent with the target value, of the control signal is determined; wherein the filter performs filtering according to the control signal with the calibration value in an operating stage.

Optionally, the filter is configured to first provide the output signal with an initial frequency according to the control signal with an initial value in an initiating stage prior to the operating stage.

Optionally, the calibration method further comprises: storing a plurality of the control signals with different initial values, and after the target value is obtained, selecting one of the control signals that minimizes a difference value between the initial frequency of the output signal and the target frequency, and providing the selected control signal to the filter.

Optionally, step of obtaining the count value according to the output signal comprises: amplifying the output signal; comparing an amplitude of the amplified output signal with a reference value to generate a square wave signal; and counting a rising edge of the square wave signal to obtain the count value.

Optionally, step of adjusting the control signal according to a comparison result between the count value and the target value representing the target frequency comprises: calculating a difference value between the count value and the target value to provide a difference value signal; adjusting the control signal according to the difference value signal, the control signal being used for controlling conduction states of various filter components in the filter; and storing the control signal that allows the difference value to be relatively small to the filter and sending that control signal to the filter, wherein, when the count value is consistent with the target value, the difference value signal of a first error sign bit is provided; when the count value is inconsistent with the target value and the count value is greater than the target value, the difference value signal of a second error sign bit of a first voltage level is provided; and when the count value is inconsistent with the target value and the count value is less than the target value, the difference value signal of the second error sign bit of a second voltage level is provided.

For the third aspect and the beneficial effects of the various optional implementations, reference may be made to the description of the first aspect, which is omitted here.

According to embodiments of the calibration circuit, the calibration method for the filter and the filter device provided by the present disclosure, by performing counting on the output signal of the filter, gradually adjusting the control signal to the calibration value according to the difference value between the count value and the target value, and controlling the filter by use of the control signal, the frequency of the output signal of the filter can be gradually adjusted to the target frequency. Technical solutions according to the embodiments of the present disclosure can achieve feedback adjustment of the filter itself, high bandwidth calibration accuracy and simple circuit structure, and can have advantages of high integration degree, accurate bandwidth and low power consumption.

Further, in embodiments of the present disclosure, the initial value of the control signal is also provided, so that the filter can firstly provide the output signal with the initial frequency according to the control signal with the initial value in the initiating stage before the operating stage, without requiring other circuit structures for providing the output signal with the initial frequency, thus saving cost and power consumption, reducing circuit occupied area and being beneficial to further improving circuit integration degree.

Further, in embodiments of the present disclosure, a plurality of control signals with different initial values can be stored, and after the target value is obtained, the adjustment module may select one of the plurality of control signals that minimizes the difference value between the initial frequency of the output signal and the target frequency and provide the selected control signal to the filter, so that the initial value of the control signal can be selected according to the target frequency, which can save the time required for bandwidth calibration and reduce the power consumption of the circuit.

In addition, the present disclosure also provides a computer-readable storage medium, which stores a program for performing bandwidth calibration on a filter, and when the program is executed by at least one processor, the calibration method for the filter as described above can be implemented.

DETAILED DESCRIPTION OF THE EMBODIMENTS

Figure 1:
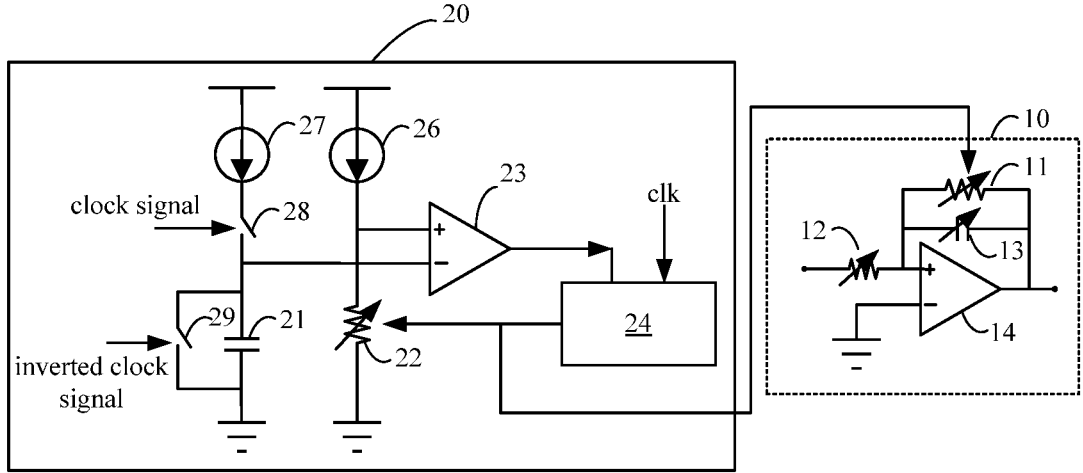
FIG. 1 shows a schematic circuit diagram of a conventional filter device provided by an embodiment of the present disclosure.

The present disclosure will be described in more detail below with reference to the accompanying drawings. Like elements are denoted by like reference numerals throughout the various figures. For the sake of clarity, various parts in the drawings are not drawn to scale. In addition, some well-known parts may not be shown in the drawings.

In the following description, numerous specific details such as structures, materials, dimensions, processing techniques and technologies of devices are described to provide a more thorough understanding of the present disclosure. However, as will be understood by those skilled in the art, the present invention may be practiced without these specific details.

It should be understood that, in the embodiments of the present disclosure, A and B are connected/coupled to indicate that A and B may be connected in series or in parallel, or A and B may be connected by other devices, which is not limited in embodiments of the present disclosure.

A calibration circuit, a calibration method for a filter and a filter device that are provided in the present disclosure can be used in a receiver, such as a radar equipment, a communication equipment, a navigation equipment, a satellite ground station, and an electronic countermeasure equipment, in various communication systems. Among which, the communication system can be, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a wireless local area network (WLAN), a Bluetooth system, a 5G communication system (5th Generation Mobile Communication Technology). The 5G communication system can be, for example, a New Radio (NR) system. It can be understood that the calibration circuit, the calibration method for the filter and the filter device provided in the present disclosure can also be applied to various future communication systems, and the present disclosure is not limited thereto.

A main function of the filter is to effectively filter out frequencies other than a target frequency in an input signal to obtain an output signal with the target frequency. With the development of wireless communication systems such as 5G, more and more electronic devices support higher frequencies and wider frequency ranges, and therefore the market puts higher demands on the operating bandwidth of the filter. In addition, the market places increasing demands on single chip to support multiple standards, and different standards have different requirements on filter bandwidth, and even when the same standard is in different application scenarios, the filter bandwidth is required to have a large adjustment range.

The operating bandwidth (or operating frequency bandwidth) of the filter is one of important parameters of the filter, which usually refers to a difference value between an upper limit $f_H$ and a lower limit $f_L$ of the operating frequency, namely $B=f_H-f_L$. The relative bandwidth $B_r=(f_H-f_L)/f_0$ of the filter device can also be used to represent the operating bandwidth, where $f_0$ refers to the center frequency of the operating bandwidth.

In a modern semiconductor manufacturing process, parameters such as resistivity of a resistor and a capacitance value of a capacitor can greatly deviate along with the process, affecting positions of a zero and pole of an operational amplifier, and further the bandwidth of the filter. The bandwidth of the filter often deviates more or less from a predetermined value, and a decrease in bandwidth accuracy naturally leads to an increase in the bit error rate or a decrease in the signal-to-noise ratio (SNR), so that the calibration circuit is an integral part of modern filter devices.

FIG. 1 shows a schematic circuit diagram of a conventional filter device. As shown in FIG. 1, the filter device comprises a filter circuit 10 and a bandwidth calibration circuit 20 which performs bandwidth calibration based on the principle of resistance calibration. The filter circuit 10 comprises a resistor array 11, a resistor array 12, a capacitor array 13, and an operational amplifier 14, wherein the resistor array 11 can be used for calibrating the filter bandwidth accuracy, the resistor array 12 can be used for changing a filter gain, and the capacitor array 13 can be used for adjusting a filter bandwidth; the bandwidth calibration circuit 20 comprises a switched capacitor circuit, a voltage division circuit, a comparator 23, and a binary search algorithm module 24, wherein the switched capacitor circuit comprises a fixed capacitor 21, a first current source 27, and clock-controlled switches 28 and 29, and the voltage division circuit comprises a resistor array 22 and a second current source 26. Outputs of the switched capacitor circuit and the voltage division circuit output corresponding comparison results through the comparator 23, and under the control of the clock signal, they are processed by the binary search algorithm module 24, and finally a stable frequency control code is output to make the filter 10 achieve the corresponding bandwidth accuracy.

For the case of bandwidth calibration based on the principle of capacitance calibration, it is similar to the example shown in FIG. 1, except that the resistor array 11 used to calibrate the bandwidth accuracy of the filter is replaced by a capacitor array which can be arranged at other suitable positions in the circuit, and then a stable frequency control code is provided using the bandwidth calibration circuit 20 to control the capacitor array, so that the filter 10 can achieve the corresponding bandwidth accuracy. The details of the capacitor calibration will not be repeated here.

However, the above two types of bandwidth calibration circuits will lead to the fact that only one of the capacitor and the resistor can be used to adjust the bandwidth of the filter, while the other one can be used to calibrate the bandwidth deviation. This bandwidth calibration circuit directly leads to the waste of a bandwidth adjustment freedom.

In an embodiment corresponding to FIG. 1, the bandwidth calibration can be realized by compensating a deviation of the filter bandwidth caused by a process variation and a temperature variation, but this bandwidth calibration solution is not accurate enough. In one bandwidth calibration solution, the bandwidth calibration of the filter can be realized by designing a complex circuit. Although this solution improves the calibration circuit of the filter, the circuit structure may be complex.

Based on this, an embodiment of the present disclosure provides a filter device, and the embodiment of the filter device provided by the present disclosure will be described below with reference to the drawings.

Figure 2:
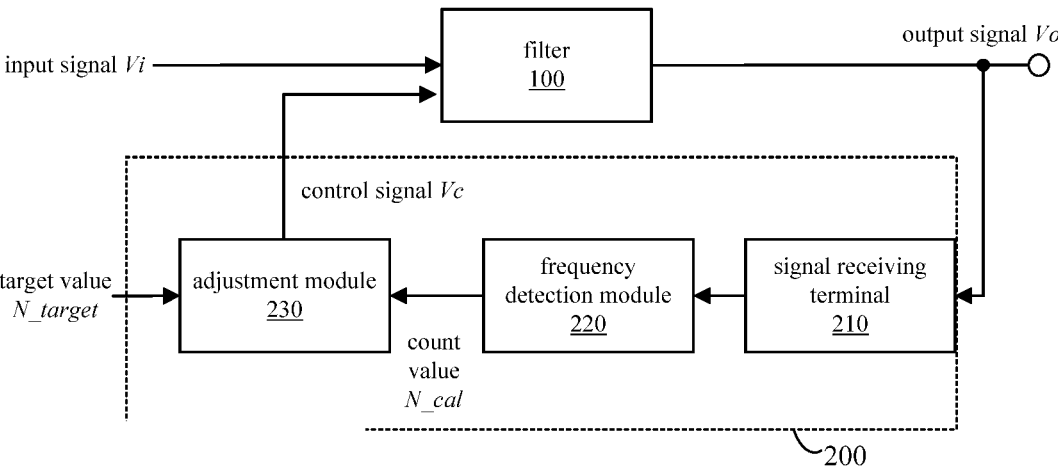
FIG. 2 shows a block diagram of a filter device of an embodiment of the present disclosure.

FIG. 2 shows a block diagram of a filter device according to an embodiment of the present disclosure. It should be understood that the filter device in an embodiment of the present disclosure can be applied to digital filters, analog filters, low-pass filters, high-pass filters, band-pass filters, surface acoustic wave filters, dielectric filters, active power filters and other types of filter architectures, and embodiments of the present disclosure is not limited thereto.

As shown in FIG. 2, the filter device of this embodiment comprises a filter 100 and a calibration circuit 200, wherein the calibration circuit 200 comprises a signal receiving terminal 210, a frequency detection module 220 and an adjustment module 230. In this embodiment, the bandwidth of the filter 100 is adjustable. Specifically, the filter 100 can perform filtering on an input signal Vi to provide an output signal Vo under configuration of the control signal provided by the calibration circuit 200.

The signal receiving terminal 210 is connected with the filter 100, and is used for receiving the output signal Vo from the filter 100. In actual operation, the signal receiving terminal 210 may be a metal wire connected to an output terminal of the filter 100, or may be a pin, a pad, a special connector, a buffer, etc. disposed in the calibration circuit 200, as long as it can realize the function of signal transmission. It should be understood that the specific implementation form of the signal receiving terminal 210 is not limited in the present disclosure.

The frequency detection module 220 is connected with the signal receiving terminal 210, and is used for obtaining a count value N_cal according to the output signal Vo, the count value N_cal representing a frequency of the output signal Vo. In this embodiment, in order to obtain the count value N_cal representing the frequency of the output signal Vo, the frequency detection module 220 can be implemented in various ways. For example, the frequency detection module 220 compares an amplitude of the output signal Vo with that of the reference voltage by using an amplitude comparator to convert the output signal Vo into a square wave signal, and then counts a rising edge or falling edge of the square wave signal by using a counter to obtain a count value N_cal. Also, for example, a frequency detector is directly disposed in the frequency detection module 220 to detect the frequency of the output signal Vo to obtain the count value N_cal, the frequency detector comprises, for example, an oscillator, a frequency divider, a gate control circuit, a gate circuit, a flip-flop, a counter and other component, and the specific implementation form of the frequency detector is not limited by the present disclosure.

The adjustment module 230 is connected with the frequency detection module 220, and is used for providing a control signal Vc, and adjusting the control signal Vc according to the count value N_cal and a target value N_target representing a target frequency, so as to adjust the frequency of the output signal Vo provided by the filter 100 until a calibration value, which allows the count value N_cal to be consistent with the target value N_target, of the control signal Vc is determined. After the adjustment module 230 acquires and stores the calibration value of the control signal Vc, it continuously provides the control signal with the calibration value to the filter 100 in the operating stage of the filter 100, so that the filter 100 can perform filtering according to the control signal Vc with the calibration value in the operating stage to obtain the output signal Vo with the target frequency.

In this embodiment, the control signal provided by the adjustment module 230 is, for example, one or more signal groups, for example, including a plurality of digital control bits, for respectively controlling conduction states of various filter components (for example, a capacitor array and/or a resistor array) in the filter 100, so as to adjust the bandwidth of the filter 100, and the conduction states of the filter components are controlled by controlling switches connected in series with the filter components. Optionally, the control signal provided by the adjustment module 230 may be a numerical control signal or an analog control signal, and each switch in the filter 100 may be a numerical control switch or an analog switch, the analog switch such as a bipolar transistor, a field effect transistor or other types of transistors.

During an operation process, in the initiating stage of the filter device, the calibration circuit 200 firstly provides the control signal Vc with an initial value, the filter 100 firstly provides the output signal Vo with an initial frequency according to the control signal Vc with the initial value, then the calibration circuit 200 adjusts the frequency of the output signal Vo by gradually adjusting the control signal Vc until the filter 100 can provide the output signal Vo with the target frequency, at this time, the calibration circuit 200 has calibrated the control signal Vc to have the calibration value, and the calibration circuit 200 stores the control signal Vc with the calibration value; in the operating stage of the filter device, the calibration circuit 200 continuously provides the control signal Vc with the calibration value, so that the filter 100 performs filtering on the input signal according to the control signal Vc with the calibration value to provide the output signal Vo with the target frequency. According to the embodiment of the present disclosure, simple and accurate feedback adjustment for the bandwidth of the filter 100 can be realized by configuring different stages of the control signal.

In some optional embodiments, the adjustment module 230 stores a plurality of control signals Vc with different initial values; in the initiating stage of the filter device, after the target value N_target is obtained, the adjustment module 230 selects one of the control signals Vc that minimizes the difference value between the initial frequency of the output signal Vo and the target frequency and provides the selected control signal to the filter 100. In this embodiment, the initial value of the control signal Vc can be selected according to the target frequency. For example, the adjustment module 230 stores the initial values of the control signals that allow the frequency of the output signal Vo of the filter 100 to be 10 kHz, 20 kHz, 30 kHz, 40 kHz and 50 kHz, respectively. If the set target frequency is 18 kHz, then the control signal that allows the frequency of the output signal of the filter to be 20 kHz is selected and provided to the filter, and then the calibration circuit 200 is used for performing feedback adjustment on the filter 100, and gradually adjusting the frequency of the output signal Vo of the filter 100 to be 18 kHz. The calibration circuit 200 of this embodiment can save the time and power consumption required for bandwidth calibration of the filter 100, which is beneficial to fast and accurate bandwidth calibration.

The calibration circuit and the filter device of embodiments of the present disclosure can realize feedback adjustment of the filter, high bandwidth calibration accuracy and simple circuit structure, and can have advantages of high integration degree, accurate bandwidth, low power consumption and the like. An exemplary filter device provided in the present disclosure will be described in detail below with reference to FIGS. 3 to 6.

Figure 3:
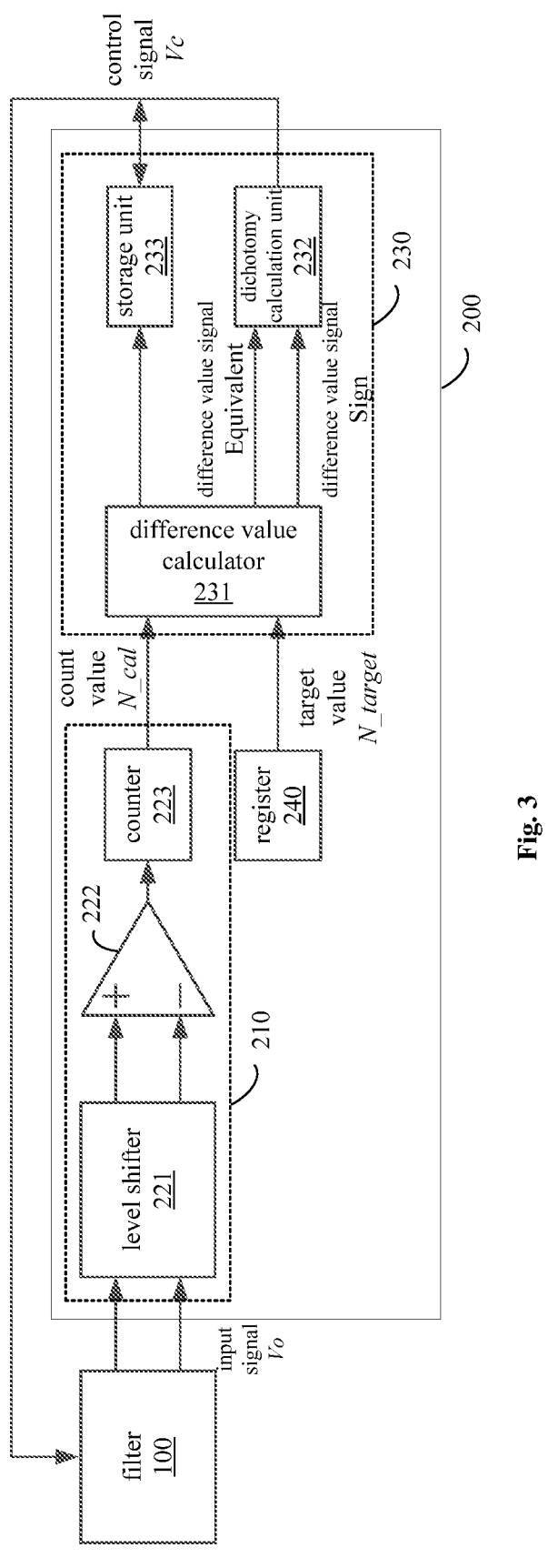
FIG. 3 shows a schematic circuit diagram of a filter device according to an embodiment of the present disclosure.

FIG. 3 shows a schematic circuit diagram of a filter device according to an embodiment of the present disclosure. As shown in FIG. 3, the filter device of this embodiment comprises a filter 100 and a calibration circuit 200, wherein the calibration circuit 200 comprises a signal receiving terminal 210, a frequency detection module 220 and an adjustment module 230. Basic functions and connections of the modules in this embodiment are the same as those in FIG. 1, so similarities are not repeated here.

In this embodiment, the signal receiving terminal 210 is a metal wire connected to an output terminal of the filter 100, the frequency detection module 220 comprises a level shifter 221, a comparator 222 and a counter 223, and the adjustment module 230 comprises a difference value calculator 231, a dichotomy calculation unit 232 and a storage unit 233.

The level shifter 221 is connected to the signal input terminal 210, and is used for amplifying an output signal Vc. In alternative embodiments, the level shifter 221 may be replaced by an amplification circuit such as a power amplifier. In other alternative embodiments, when the output signal Vc has a sufficiently large amplitude, the output signal Vc itself is within the operating range of the comparator 222, and the configuration of the level shifter 221 can be canceled. For example, if a peak voltage of the output signal Vc is 6 volts (V) and the operating range of the comparator is 1-10 V, the output signal Vc can be directly input to the comparator 222 without amplifying the output signal Vc.

The comparator 222 is connected to the level shifter 221 and is used for comparing an amplitude of the amplified output signal with a reference value to generate a square wave signal. For example, the comparator 222 is a voltage comparator, its non-inverting input terminal receives the amplified output signal and its inverting input terminal receives the reference voltage, when the amplitude of the amplified output signal is greater than or equal to that of the reference voltage, the comparator 222 outputs a high-level voltage, and when the amplitude of the amplified output signal is less than the reference voltage, the comparator 222 outputs a low-level voltage, so that the comparator 222 converts the amplified output signal into a square wave, and the square wave signal may represent the frequency of the output signal Vc generated by the filter.

The counter 223 is connected to the comparator 222, and is used for counting a rising edge of the square wave signal to obtain the count value N_cal. The counter 223 is, for example, an RS flip-flop, a T flip-flop, a D flip-flop, a JK flip-flop or other types of flip-flops, or a combinational circuit formed by the aforementioned flip-flops.

In some unillustrated embodiments, since the counter 223 counts the frequencies within a certain time range, for example, counting 100 in one second (s), the system will determine that the frequency of the output signal is 100 Hz; however, in fact, the frequency of the output signal may not be uniformly distributed in 1 s, for example, the frequency of the output signal gradually changes from 50 Hz to 200 Hz, so the count value in 1 s may also be 100, and in such case, the count value provided by the counter 223 does not accurately represent the frequency of the output signal Vc. In one optional embodiment, a logic circuit with a buffer function is added at a rear stage of the counter 223 to store and calculate the count values in consecutive time periods. Only when the count values of consecutive times are basically the same, the average count value is provided to the back-end circuit, such that the accuracy of frequency detection can be increased. In addition, the counter 223 can select irregular time (for example, 1 s, 1.5 s, 2 s) to count, and then calculate the average value of the count values in unit time, avoiding the influence of the regular change of the output signal on a frequency detection result.

Specifically, as an example, a first logic circuit is further connected after the counter 223, the first logic circuit comprises a buffer and a calculation unit, the buffer is used for storing the count values N_cal1-N_caln obtained by the counter 223 in a plurality of consecutive time periods, the calculation unit is used for judging whether the count values N_cal1-N_caln are basically consistent, when the difference value between the count values N_cal1-N_caln is within the allowable error range, the calculation unit calculates an average value of the count values N_cal1-N_caln and provides it to the difference value calculator 231. For example, if the counter 223 provides one count value every 1 second, the buffer stores three count values within 3 seconds; when the difference values between the three count values do not exceed 5%, the calculation unit calculates the average value of the count values and provides it to the difference value calculator 231. In the technical solution of this embodiment, the first logic circuit will provide the count value to a subsequent circuit only when the frequency of the output signal is basically constant in a plurality of consecutive time periods, so that the accuracy of frequency detection can be improved, and the problem that the count value cannot accurately represent the frequency of the output signal due to the change of the frequency of the output signal in the counting duration range of the counter can be avoided.

As another example, the counter 223 selects a plurality of time periods with durations not exactly the same to count the square wave signals, a second logic circuit is further connected after the counter 223, the second logic circuit comprises a buffer and a calculation unit, the buffer is used for storing the count values N_cal1-N_caln obtained by the counter 223 in a plurality of time periods with the durations not exactly the same, the calculation unit is used for obtaining the count value in unit time in each time period according to the time maintained in each time period and its corresponding count value, and when the difference value between the count values in each unit time is within the allowable error range, the calculation unit calculates the average value of the count values in each unit time and provides it to the difference value calculator 231. For example, if the counter 223 provides count values at intervals of 1 second, 1.5 seconds, and 2 seconds, the buffer stores three count values within 4.5 seconds, and the calculation unit divides the 3 count values by their corresponding times; when the difference value between the count values in each unit time does not exceed 5%, the calculation unit calculates the average value of the count values in each unit time and provides it to the difference value calculator 231. In the technical solution of this embodiment, the first logic circuit will provide the count value to the subsequent circuit only when the frequency of the output signal is basically constant in unit time in a plurality of time periods with durations not exactly the same, so that the accuracy of frequency detection can be further improved, and the problem that the count value cannot accurately represent the frequency of the output signal due to the regular change of the frequency of the output signal in the counting duration range of the counter can be avoided.

The difference value calculator 231 is connected to the counter 223, and is used for calculating the difference value between the count value N_cal and the target value N_target. Specifically, when the count value is consistent with the target value, the difference value calculator 231 provides a difference value signal of a first error sign bit, wherein the difference value signal of the first error sign bit represents that the frequency of the output signal reaches the target frequency, and at this time the control signal stored in the storage unit 233 also reaches the calibration value; when the count value is inconsistent with the target value, and the count value is greater than the target value, the difference value calculator 231 provides a difference value signal of a second error sign bit of the first voltage level, at this time, the difference value signal needs to be sent to the dichotomy calculation unit 232, so that the dichotomy calculation unit 232 can search upwards for the control signal of the standard value; when the count value is inconsistent with the target value, and the count value is less than the target value, the difference value calculator 231 provides the difference value signal of the second error sign bit of the second voltage level, at this time, it is also necessary to send the difference value signal to the dichotomy calculation unit 232, so that the dichotomy calculation unit 232 can search downwards for the control signal of the standard value.

The dichotomy calculation unit 232 is connected to the difference value calculator 231, and is used for adjusting the control signal according to the difference value, specifically, adjusting the control signal according to the difference value signal provided by the difference value calculator 231. For example, the first error sign bit of the difference value signal is Equivalent, indicating that the calibration has reached the target value, and the second error sign bit is Sign, indicating that the calibration target has not been reached; the dichotomy calculation unit 232 continues the calibration process according to the indication bit of Sign, when Sign is 1, the digital control bit of the control signal searches upwards (the adjusted control signal will increase the capacitance or resistance value in the filter 100), and when Sign is 0, the digital control bit of the control signal search downwards (the adjusted control signal will reduce the capacitance or resistance value in the filter 100), and the adjusted capacitor array and/or resistor array will affect the frequency of the output signal of the filter 100, thus affecting the counting of the counter 223. The digital control bit of the control signal adjusted each time will be saved in the storage unit 233, and be compared with the digital control bit of the control signal adjusted next time, the digital control bit of the control signal that allows the difference value between the count value and the target value relatively small is saved, and the calibration will continue. When Equivalent is high, it means that the calibration has reached the target value, at this time, the value of the digital control bit of the control signal is saved and sent to the filter 100 as the calibration value of the control signal, and the calibration process in the initiating stage is finished.

The storage unit 233 is connected to the difference value calculator 231 and the dichotomy calculation unit 232, and is used for storing the digital control bits of the control signals in various stages. Specifically, the storage unit stores an initial value of the control signal, the control signal that allows the difference value to be relatively small, and the calibration value of the control signal. After the control signal that allows the difference value to be relatively large is obtained, the digital control bit of the control signal that allows the difference value to be relatively large can be deleted to save memory.

Optionally, the filter device further comprises a register 240 for storing a target value N_target. In an alternative embodiment, the register 240 may be omitted and the target value N_target may be directly input to the difference value calculator 231.

The calibration circuit and the filter device according to embodiments of the present disclosure can realize feedback adjustment of the filter, high bandwidth calibration accuracy and simple circuit structure, and can have advantage of high integration degree, accurate bandwidth, low power consumption and the like.

Figure 4:
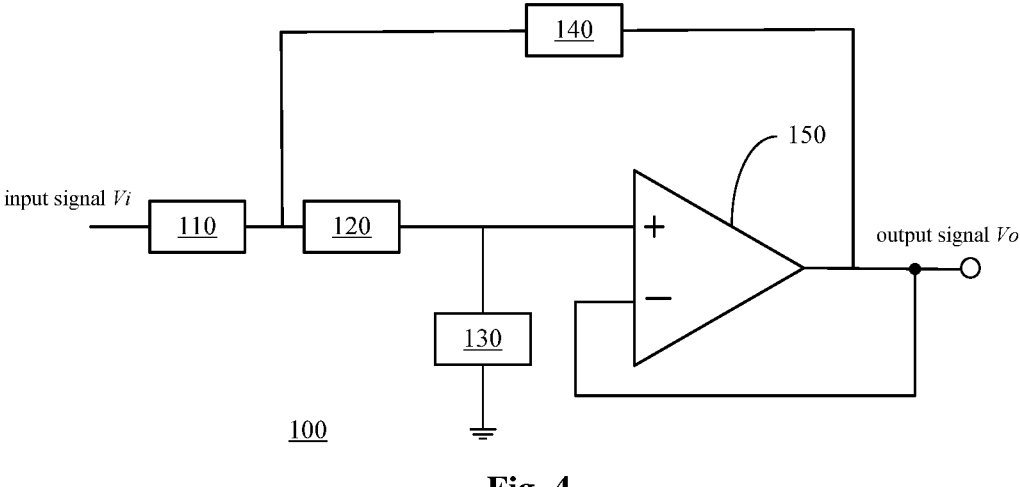
FIG. 4 shows a schematic circuit diagram of a filter of an embodiment of the present disclosure.
Figure 5:
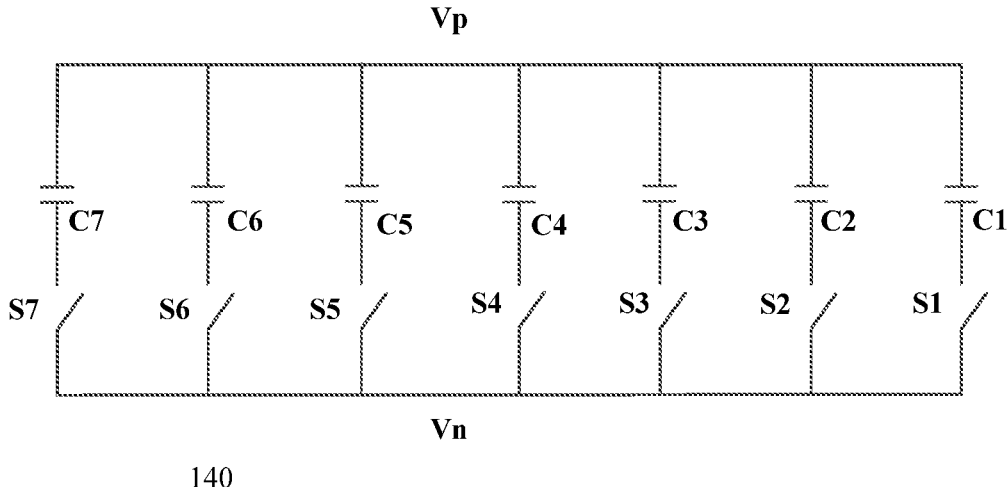
FIG. 5 shows a schematic circuit diagram of a filter component array in a filter of an embodiment of the present disclosure.

FIG. 4 shows a schematic circuit diagram of a filter according to an embodiment of the present disclosure; and FIG. 5 shows a schematic circuit diagram of a filter component array in the filter according to the embodiment of the present disclosure. It should be understood that the filter structure shown in FIG. 4 only serves as an example, and the filter used in the present disclosure can be any structure, as long as it contains at least one capacitor array, a resistor array or an inductor array so that a bandwidth point of the filter 100 can be adjusted.

As shown in FIG. 4, the filter 100 comprises a first resistor module 110, a second resistor module 120, a first capacitor module 130, a second capacitor module 140 and an operational amplifier 150. A first terminal of the first resistor module 110 receives the input signal Vi and a second terminal thereof is connected to a first terminal of the second resistor module 120, a second terminal of the second resistor module 120 is connected to a non-inverting input terminal of the operational amplifier 150, the second terminal of the second resistor module 120 is further connected to a reference ground potential via the first capacitor module 130, the inverting input terminal of the operational amplifier 150 is connected to the output terminal, and an output terminal of the operational amplifier 150 is further connected to the first terminal of the second resistor module 120 via the second capacitor module 140, and the output terminal of the operational amplifier 150 provides the output signal Vo as the output terminal of the filter 100.

In this embodiment, at least one of the first resistor module 110, the second resistor module 120, the first capacitor module 130, and the second capacitor module 140 is a filter component array, and the filter component array comprises a plurality of filter components connected in parallel, and the filter components are connected in series with switches, so that the frequency of the output signal Vo can be adjusted by adjusting the conduction state of any filter component in the filter component array.

As an example, as shown in FIG. 5, the second capacitor module 140 is a filter component array, which comprises 7 capacitors C1-C7 connected in parallel, and the capacitors C1-C7 are each connected in series with its corresponding switches S1-S7, and the switches S1-S7 are each controlled by the control signal, which control signal in this example comprises at least 7 digital control bits to control the switches S1-S7 respectively. In addition, the control signal may further comprise 8 digital control bits, one of which is invalid. Optionally, a capacitance value of each capacitor is multiplied, for example, the capacitance value of a capacitor C1 is 1 μF, the capacitance value of a capacitor C2 is 2 μF, the capacitance value of a capacitor C3 is 4 μF, the capacitance value of a capacitor C4 is 8 μF, the capacitance value of a capacitor C5 is 16 μF, the capacitance value of a capacitor C6 is 32 μF, and the capacitance value of a capacitor C7 is 64 μF.

Some examples of the filter devices of the embodiments of the present disclosure have been described above, however, the embodiments of the present disclosure are not limited thereto, and there may be extensions and variations in other ways.

For example, it should be understood that the reference ground potential in the previous embodiment can be replaced by other non-zero reference potentials (with positive or negative voltage amplitude) or reference signals with controlled changes in alternative embodiments.

Also, for example, the inductors and capacitors provided by embodiments of the present disclosure can be lumped parameter capacitive components and inductive components, or other equivalent components with similar functions to capacitors and inductors. Equivalent structures described herein are structure that may provide inductive and/or capacitive impedance, such as, but not limited to, microstrip lines, varactors, patterned conductor structures.

Again, for example, the aforementioned filter device can be a discrete device, can also be a circuit unit, or can be combined into a broadband power amplifier module with high efficiency and linearity. In other implementations, the aforementioned filter 100 can be packaged in a device, and the calibration circuit 200 can be used as a load line structure at the periphery of the device.

Also, those of ordinary skill in the art will recognize in combination with the various example structures and methods described in the embodiments disclosed herein, various configurations and adaptations of each structure or reasonable variations of the structures may be used to achieve the described functionality, but such implementations are not to be considered as beyond the scope of the present disclosure. Furthermore, it should be understood that the connection relationship between the components of the amplifier in the foregoing figures in the embodiments of the present disclosure is an illustrative example, and does not set any limit to the embodiments of the present disclosure.

Figure 6:
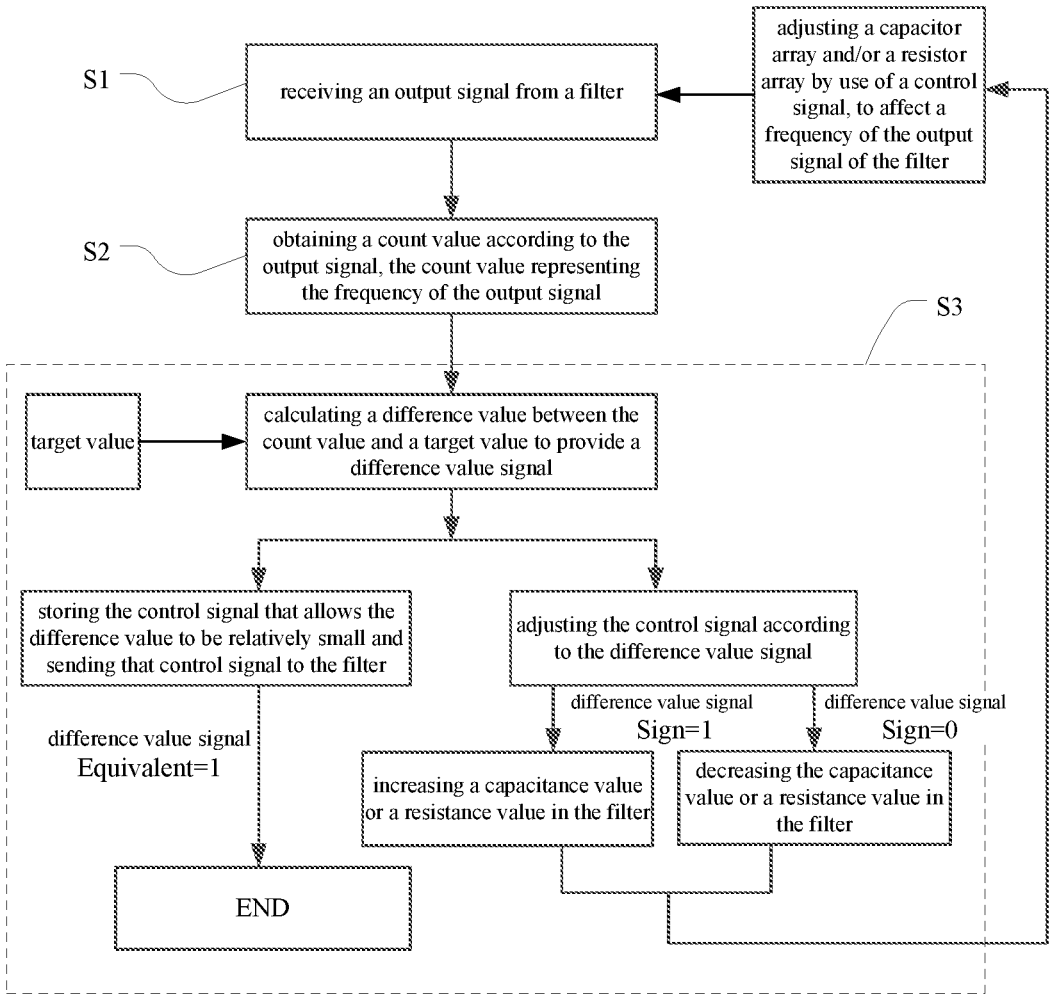
FIG. 6 shows a flowchart of a calibration method for a filter of an embodiment of the present disclosure.

FIG. 6 shows a flowchart of a calibration method for the filter according to the embodiment of the present disclosure.

As shown in FIG. 6, the calibration method for the filter comprises steps S1-S3.

In step S1, the output signal from the filter is received. In the initiating stage before the operating stage of the filter, the output signal with the initial frequency is first provided according to the control signal with the initial value. A plurality of control signals with different initial values are stored, and after the target value is obtained, one of the control signals that minimizes the difference value between the initial frequency of the output signal and the target frequency is selected and provided to the filter.

In step S2, a count value is obtained according to the output signal, the count value representing a frequency of the output signal. In this step, the output signal is amplified; an amplitude of the amplified output signal is compared with a reference value to generate a square wave signal; and a rising edge of the square wave signal is counted to obtain a count value.

In step S3, the control signal is adjusted according to the count value and the target value representing the target frequency, so as to adjust the frequency of the output signal provided by the filter until a calibration value, which allows the count value to be consistent with the target value, of the control signal is determined, wherein the filter performs filtering according to the control signal with the calibration value in the operating stage.

In this step, for example, a difference value between the count value and the target value is calculated to provide a difference value signal; a control signal is adjusted according to the difference value signal, the control signal being used for controlling conduction states of various filter components in the filter; and the control signal that allows the difference value to be relatively small is stored and sent to the filter, specifically, when the count value is consistent with the target value, a difference value signal of a first error sign bit is provided; when the count value is inconsistent with the target value and the count value is greater than the target value, a difference value signal of a second error sign bit of a first voltage level is provided; and when the count value is inconsistent with the target value and the count value is less than the target value, a difference value signal of the second error sign bit of a second voltage level is provided.

Specifically, the first error sign bit 'Equivalent' of the difference value signal indicates that the calibration has reached the target value, and the second error sign bit 'Sign' indicates that the calibration target has not been reached; the calibration process continues according to the bit 'Sign' for indication, when 'Sign' is 1, the digital control bit of the control signal searches upwards (the adjusted control signal will increase the capacitance or resistance value in the filter), and when 'Sign' is 0, the digital control bit of the control signal search downwards (the adjusted control signal will reduce the capacitance or resistance value in the filter), and the adjusted capacitor array and/or resistor array will affect the frequency of the output signal of the filter, thus affecting the counting of the counter. The digital control bit of the control signal adjusted each time will be saved in the storage unit, and be compared with the digital control bit of the control signal adjusted next time, the digital control bit of the control signal that allows the difference value between the count value and the target value relatively small is saved, and the calibration will continue. When 'Equivalent' is high, it indicates that the calibration has reached the target value, at this time, the value of the digital control bit of the control signal is saved as the calibration value of the control signal and sent to the filter, and the calibration process in the initiating stage is finished.

To sum up, the embodiment of the present disclosure provides a calibration circuit and a calibration method for a filter, as well as a filter device and electronic equipment comprising the calibration circuit. According to the calibration circuit provided according to embodiments of the present disclosure, by performing counting on the output signal of the filter, gradually adjusting the control signal to the calibration value according to the difference value between the count value and the target value, and controlling the filter by use of the control signal, the output signal of the filter can be gradually adjusted to have the target frequency. Technical solutions according to embodiments of the present disclosure can achieve feedback adjustment of the filter itself, high bandwidth calibration accuracy and simple circuit structure, and can have advantages of high integration degree, accurate bandwidth and low power consumption.

In addition, the present disclosure also provides a computer-readable storage medium (not shown), wherein the computer-readable storage medium is configured to store a program for bandwidth calibration of the filter, when the program is executed by at least one processor, steps of the calibration method for the filter as shown in FIG. 6 can be implemented, which will not be repeated here.

It should be noted that, relational terms such as first and second herein are used solely to distinguish one entity or operation from another entity or operation, without necessarily requiring or implying any actual such relationship or order between such entities or operations. Also, the terms "including", "comprising" or any other variation thereof, are intended to cover a non-exclusive inclusion, such that a process, method, article, or apparatus that comprises a list of elements does not include only those elements but may include other elements not expressly listed or inherent to such process, method, article, or apparatus. Without further limitation, an element defined by the phrase "comprising an . . . " does not exclude the presence of other identical elements in the process, method, article, or apparatus that comprises the element.

In accordance with the embodiments of the present disclosure, as described above, these embodiments are not intended to be exhaustive or to limit the present disclosure to the precise embodiments described. Obviously, many modifications and variations can be made in light of the above description. These embodiments are chosen and described in detail in this description in order to best explain the principles of the present disclosure and its practical application, so that those skilled in the technical field can make good use of the present disclosure and the modifications according to the present disclosure. The present application is limited only by the claims and their full scope and equivalents.

What is claimed is:

1. A calibration circuit for a filter, which is configured to perform filtering under configuration of a control signal to provide an output signal, wherein the calibration circuit comprises:

a signal receiving terminal, connected with the filter and configured to receive the output signal from the filter;

a frequency detection module, connected with the signal receiving terminal and configured to obtain a count value according to the output signal, the count value representing a frequency of the output signal; and an adjustment module, connected with the frequency detection module and configured to adjust the control signal according to the count value and a target value representing a target frequency, so as to adjust the frequency of the output signal provided by the filter until a calibration value, which allows the count value to be consistent with the target value, of the control signal is determined;

wherein the filter is configured to perform filtering according to the control signal with the calibration value in an operating stage, wherein the adjustment module is configured to: calculate a difference value between the count value and the target value to provide a difference value signal; adjust the control signal according to the difference value signal; and store the control signal that allows the difference value to be relatively small and sending that control signal to the filter, wherein the control signal is used for controlling conduction states of various filter components in the filter, wherein:

when the count value is consistent with the target value, the difference value signal of a first error sign bit is provided;

when the count value is inconsistent with the target value and the count value is greater than the target value, the difference value signal of a second error sign bit of a first voltage level is provided;

when the count value is inconsistent with the target value and the count value is less than the target value, the difference value signal of a second error sign bit of a second voltage level is provided.

2. The calibration circuit according to claim 1, wherein the adjustment module is further configured to provide an initial value of the control signal, so that the filter is configured to first provide the output signal with an initial frequency according to the control signal with the initial value in an initiating stage prior to the operating stage.

3. The calibration circuit according to claim 2, wherein the adjustment module is configured to store a plurality of the control signals with different initial values, and after the target value is obtained, the adjustment module is configured to select one of the control signals that minimizes a difference value between the initial frequency of the output signal and the target frequency and provide the selected control signal to the filter.

4. The calibration circuit according to claim 1, wherein the frequency detection module comprises:

a level shifter, connected to the signal receiving terminal and configured to amplify the output signal;

a comparator, connected to the level shifter and configured to compare an amplitude of the amplified output signal with a reference value to generate a square wave signal; and a counter, connected to the comparator and configured to count a rising edge of the square wave signal to obtain the count value.

5. The calibration circuit according to claim 1, wherein the adjustment module comprises:

a difference value calculating circuit, configured to calculate the difference value between the count value and the target value to provide the difference value signal;

a dichotomy calculating circuit, configured to adjust the control signal according to the difference value signal; and a storage unit, configured to store an initial value of the control signal, the control signal that allows the difference value to be relatively small, and the calibration value of the control signal.

6. The calibration circuit according to claim 1, wherein the adjustment module further comprises a register for storing the target value.

7. A filter device, comprising the filter and the calibration circuit according to claim 1, the calibration circuit being connected with the filter, wherein the filter is configured to perform filtering on the input signal to obtain an output signal; and the calibration circuit is configured to provide the control signal to adjust the frequency of the output signal to the target frequency.

8. The filter device according to claim 7, wherein the filter is configured to first provide the output signal with an initial frequency according to the control signal with an initial value in an initiating stage, and perform filtering according to the control signal with the calibration value in the operating stage after the initiating stage.

9. The filter device according to claim 7, wherein the filter comprises a plurality of filter components, and the control signal is used for controlling conduction states of the plurality of filter components, thereby adjusting the frequency of the output signal, wherein the plurality of filter components comprise a capacitor array and/or a resistor array.

10. The calibration circuit according to claim 1, wherein the frequency detection module is configured to store a plurality of detected count values obtained in a plurality of consecutive time periods, respectively, calculate an average value of the plurality of detected count values when a difference between the plurality of detected count values is within a preset error range, and output the average value as the count value to the adjustment module.

11. A calibration method for a filter, which is configured to perform filtering under configuration of a control signal to provide an output signal, wherein the calibration method comprises:

receiving the output signal from the filter;

obtaining a count value according to the output signal, the count value representing a frequency of the output signal; and adjusting the control signal according to the count value and a target value representing a target frequency, so as to adjust a frequency of the output signal provided by the filter until a calibration value, which allows the count value to be consistent with the target value, of the control signal is determined;

wherein the filter performs filtering according to the control signal with the calibration value in an operating stage, wherein step of adjusting the control signal according to a comparison result between the count value and the target value representing the target frequency comprises:

calculating a difference value between the count value and the target value to provide a difference value signal;

adjusting the control signal according to the difference value signal, the control signal being used for controlling conduction states of various filter components in the filter; and storing the control signal that allows the difference value to be relatively small and sending that control signal to the filter, wherein:

when the count value is consistent with the target value, the difference value signal of a first error sign bit is provided;

when the count value is inconsistent with the target value and the count value is greater than the target value, the difference value signal of a second error sign bit of a first voltage level is provided;

when the count value is inconsistent with the target value and the count value is less than the target value, the difference value signal of a second error sign bit of a second voltage level is provided.

12. The calibration method according to claim 11, wherein the filter is configured to first provide the output signal with an initial frequency according to the control signal with an initial value in an initiating stage prior to the operating stage.

13. The calibration method according to claim 12, further comprising: storing a plurality of the control signals with different initial values, and after the target value is obtained, selecting one of the control signals that minimizes a difference value between the initial frequency of the output signal and the target frequency and providing the selected control signal to the filter.

14. The calibration method according to claim 11, wherein step of obtaining the count value according to the output signal comprises:

amplifying the output signal;

comparing an amplitude of the amplified output signal with a reference value to generate a square wave signal; and counting a rising edge of the square wave signal to obtain the count value.

* * * * *